United States Patent
Grove

[15] 3,638,908
[45] Feb. 1, 1972

[54] GATE VALVE BODY RIB REINFORCEMENT

[72] Inventor: Marvin H. Grove, Houston, Tex.
[73] Assignee: M&J Valve Company, Houston, Tex.
[22] Filed: Apr. 29, 1970
[21] Appl. No.: 33,012

[52] U.S. Cl. .................................251/329, 251/366
[51] Int. Cl. .................................................F16k 27/04
[58] Field of Search ................................251/329, 366

[56] References Cited

UNITED STATES PATENTS

| | | |
|---|---|---|
| 3,173,652 | 3/1965 | Grove..............................251/329 |
| 3,260,503 | 7/1966 | Grove..............................251/329 |
| 2,904,306 | 9/1959 | Bryant..........................251/329 X |
| 3,265,354 | 8/1966 | Anderson.......................251/329 |

Primary Examiner—Arnold Rosenthal
Attorney—Flehr, Hohbach, Test, Albritton & Herbert

[57] ABSTRACT

A gate valve having a fabricated body comprising flat parallel end walls with aligned openings (i.e., flow passages) adapted to be connected to associated piping. The end walls are reinforced against forces applied to the piping which tend to deflect the end walls. The reinforcement consists of ribs which are applied to the end walls to reinforce them against both outward and inward deflection.

3 Claims, 5 Drawing Figures

PATENTED FEB 1 1972
3,638,908
SHEET 1 OF 2
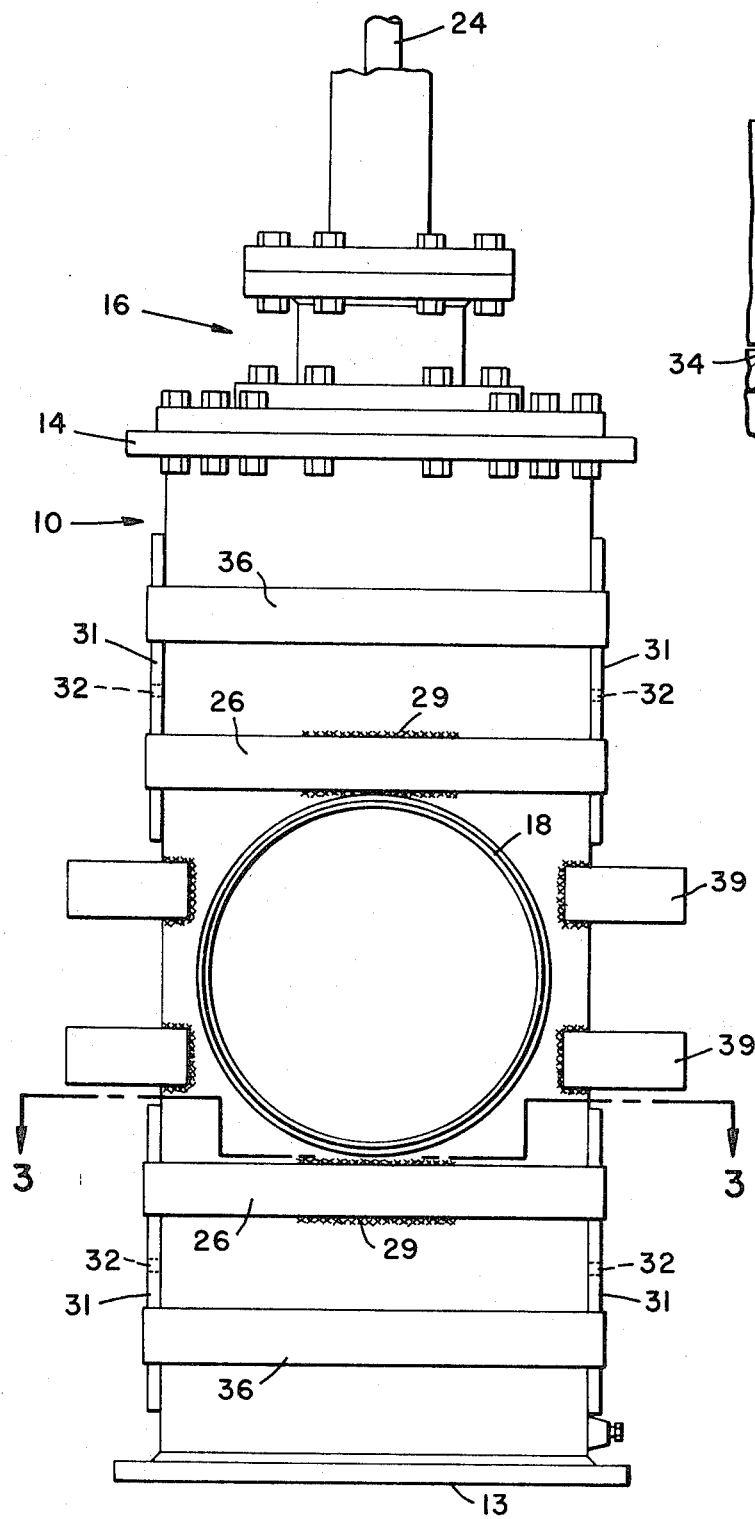
FIG_1
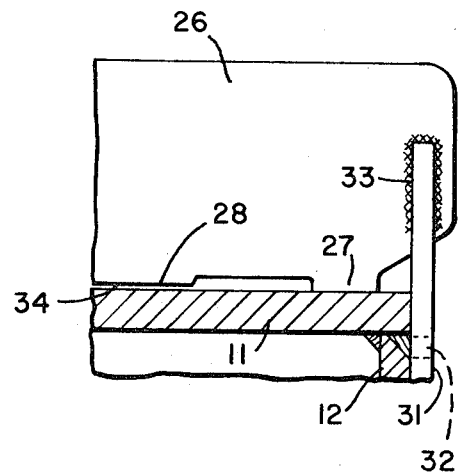
FIG_4
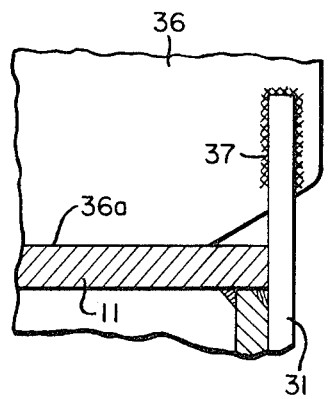
FIG_5
INVENTOR.
MARVIN H. GROVE
BY
Flehr, Hohbach, Test,
Albritton & Herbert
ATTORNEYS

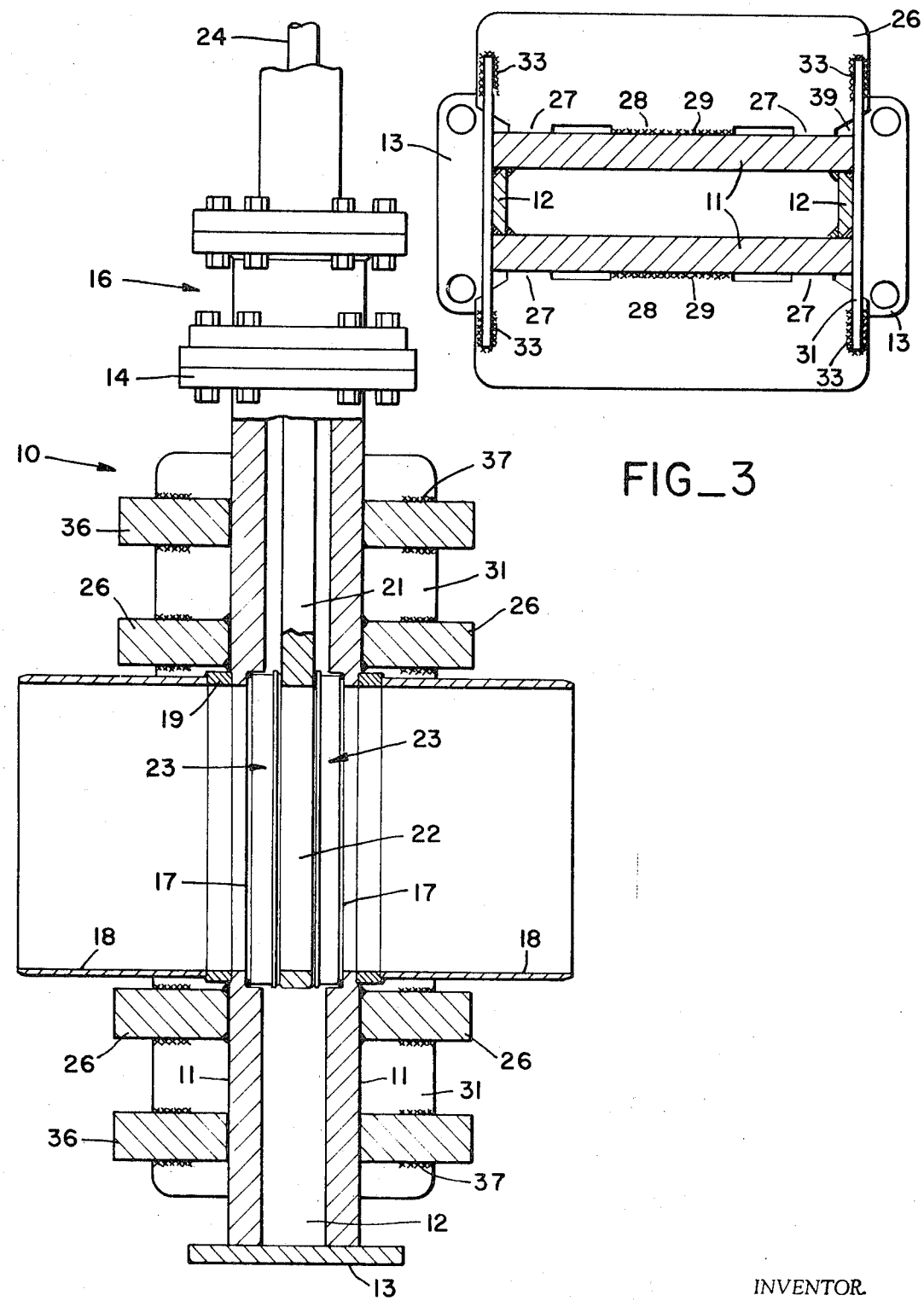

3,638,908

GATE VALVE BODY RIB REINFORCEMENT

BACKGROUND OF THE INVENTION

Many of the larger gate valves such as are manufactured for pipeline and other services have bodies fabricated by welding from mill steel shapes. Examples of such valves are shown in U.S. Pat. Nos. 3,415,489 and 3,481,580. A typical valve body of this type consists of flat parallel end walls attached to parallel sidewalls at their longitudinal edges. The end walls have aligned openings forming flow passages, and hubs or pipe sections for making connection with associated piping are welded to the end walls in regions surrounding the flow passages. The gate for such valves is made flat and may be relatively short, or may be provided with a port opening adapted to register with the flow passages for full open position of the valve. For the higher operating pressures it is common to provide such bodies with external ribs which serve to reinforce the end walls against outward deflection due to internal pressure. The annular sealing assemblies employed in such valves are generally mounted upon the body to surround the flow passages, and may vary in construction. One type of sealing assembly which has been used with good results makes use of resilient material (e.g., nylon), and is shown for example in Grove U.S. Pat. Nos. 3,269,695 and 3,339,886. The rib reinforcement which has been used with such valve bodies has been designed primarily for the purpose of preventing outward deflection of the end walls. Under certain conditions, either during or after installation of a valve with associated piping, forces may be applied to the hubs or connected pipe sections of such magnitude that they cause substantial inward deflection of the end walls. Such deflection may not cause any structural damage but may interfere with proper functioning of the sealing assemblies, or in extreme conditions may make it impossible to operate the gate between open and closed conditions. By way of example, the rib reinforcement illustrated in Grove et al. U.S. Pat. No. 3,481,580 makes use of abutting contacts between the inner edges of a pair of ribs and centrally located regions of the end walls, with the extremities of the ribs being secured together by tie plates. Even if the central portions of such ribs are attached to the end walls by welding, such an arrangement is primarily effective to prevent outward bulging of the end walls under internal body pressure.

SUMMARY OF THE INVENTION

This invention relates generally to gate valves, and particularly gate valves of the fabricated type having reinforced end walls.

It is an object of the invention to provide an improved gate valve construction of the above type which adequately reinforces the end walls against inward deflection as the result of forces applied to the connected hubs or pipe sections.

Another object of the invention is to provide reinforcing means for the bodies of fabricated gate valves, which is relatively simple in construction, and which does not add materially to cost of manufacture.

Additional objects and features of the invention will appear from the following description in which the preferred embodiment has been set forth in detail in conjunction with the accompanying drawing.

BRIEF DESCRIPTION OF THE DRAWING

FIG. 1 is an end view illustrating a valve incorporating the present invention.

FIG. 2 is a side elevational view of the valve shown in FIG. 1, the body being shown in section.

FIG. 3 is a cross-sectional view taken along the lines 3—3 of FIG. 1.

FIG. 4 is an enlarged detail showing one of the reinforcing ribs

FIG. 5 is an enlarged detail like FIG. 4 but showing another one of the reinforcing ribs.

DESCRIPTION OF THE PREFERRED EMBODIMENT

The valve shown in FIGS. 1 and 2 consists of a body of fabricated construction which is rectangular in transverse section. The end walls 11 are made flat and disposed parallel, and can be made of structural steel plate. The sidewalls 12 are secured to the side margins of the end walls by welding. A closure plate 13 is welded to the lower extremity of the body, and the upper extremity is provided with a flange 14 which serves to mount the bonnet assembly 16. The bonnet assembly in turn serves to mount valve-operating means, which may be an operator of the hydraulic type, or a handwheel geared to the operating rod of the valve.

The end walls 11 are shown provided with aligned openings 17 which form flow passages adapted to communicate with associated piping. In the drawing rings 19 are shown having weld connections with the end walls 11 in regions surrounding the flow passages 17, and these rings in turn are shown welded to the hubs or pipe sections 18. This construction is disclosed in Grove U.S. Pat. No. 3,481,580.

The gate 21 disposed within the body is in the form of a flat plate, and in this instance is provided with a port 22 which registers with the flow passages 17 for full open position of the valve. Annular sealing assemblies 23 are seated within recesses formed in the end walls 11 and make sealing contact with the side surfaces of the gate 21. These assemblies may be of the type disclosed in U.S. Pat. No. 3,339,886.

Within the valve body the operating rod 24 has its inner end connected to the gate 21. The bonnet assembly 16 has sealing means which prevents leakage about the operating rod. The exterior end of the operating rod is connected to the operating means for moving the valve between full open and closed positions.

The end walls 11 of the body are reinforced by a plurality of ribs which extend across the end walls in one or more pairs. One pair consists of ribs 26 disposed in a common plane that is perpendicular to the end walls and perpendicular to the longitudinal axis of the valve body. These ribs are in close proximity with the adjacent portion of the hubs 18. Assuming that the body is as illustrated with extensions above and below the hubs, then a similar pair of ribs 26 is disposed immediately below the hubs. The configuration for ribs 26 is shown in FIGS. 3 and 4. Each rib has a major dimension slightly greater than the width of the end walls 11. The inner edge of each rib is cut away to provide the pads or feet 27 which are in abutting contact with the adjacent portions of the end walls 11. An intermediate portion 28 of each rib is secured to the adjacent portion of the end wall by welding 29. The pads or feet 27 are located along the side margins of the end walls 11. The portion 28, which is secured to the end wall by welding, is spaced inwardly from the pads 27.

The extremities of the ribs 26 are secured together along the sides of the valve body by means such as the tie plates 31. It is desirable to lightly attach these plates to the sides of the valve body, as by plug welds 32. The plates 31 are provided with slots which accommodate the extremities of the ribs 26, an during assembly of the body these parts are secured together by welding 33. During the welding of theses parts, care is taken to cause the pads or feet 27 to be drawn into tight abutting relationship with the side margins of the end walls. The inner corners of ribs 26 are cut away, as indicated at 26a, whereby the welding 33 is spaced outwardly from the corners of the body.

As shown in FIG. 4, the ribs 26 are formed whereby the portions 28 are spaced by a small amount of clearance 34 form the surface of the adjacent end wall 11 after the ribs have been welded to the tie plates 31. Thereafter the weld metal 35 is applied, and this welding operation tends to draw the central portion of each rib toward the central portion of the corresponding end wall 11, thus prestressing both the rib and end wall, and more tightly forcing the pads 27 against the side margins of the end wall.

In the particular embodiment illustrated additional pairs of ribs 36 are provided. The extremities of these ribs are likewise accommodated in slots provided in the tie plates 31 and they are secured to the tie plates by welding 37. These ribs may have a configuration substantially as disclosed in U.S. Pat. No. 3,481,580 (FIG. 3) with a single intermediate portion 36a of each rib in abutting relationship with the medial portion of the adjacent end wall 11. A similar pair of ribs 36 is shown disposed on the body extension below the hubs.

In addition to the reinforcing means described above, it is desirable to provide some reinforcement for that portion of the body adjacent the sides of the hubs. Thus tie members 39 extend across the sides of the body and may have a configuration corresponding to a C-clamp. These members and extensions 39 are secured to the adjacent portions of the body by welding.

When the valve described above is installed with a pipeline either above the surface of the ground or in a trench, the hubs 18 are welded to associated pipe sections. During subsequent positioning of the line, severe forces may be applied to the pipe sections and to the end walls 11, and if these end walls should deflect any substantial amount under such forces, the normal functioning of the valve may be impaired, or the gate might be jammed between the sealing assemblies to prevent its normal movement. Also after installation of a valve in a pipeline, severe forces may be applied to the end walls 11 from the adjacent pipe sections, due to thermal expansion and contraction. The rib construction described above, having reference specifically to the rib pairs 26, effectively reinforces the end walls 11 against such forces. For example, if a portion of the end wall to which the hub is attached by welding tends to be deflected inwardly by forces applied through the associated piping, then the associated rib 26, by virtue of the weld connection 29 between its medial portion and the end wall, functions as an exterior strut having bearing upon the margins of the end wall by virtue of the pads or feet 27. Also the end walls are effectively reinforced to resist forces tending to deflect outwardly. Such forces may be developed by internal body pressure, by tension of the associated piping, or body. Under such conditions the walls are effectively reinforced by bending stresses applied to the ribs 26 in an opposite direction through the portions 29 of the ribs, and with the tie plates 31 being put in tension by virtue of the weld connections 33 with the extremities of the ribs. The tie plates are capable of limited bending to accommodate any bending of the ribs, without stressing the weld connections 33 or 35.

It will be noted that when a rib 26 is acting as an external reinforcing strut to resist outward deflection of the adjacent end wall portion, any bending deflection of the rib tends to occur about the weld connections 33 as fulcrums. However, when the rib is acting as a reinforcing strut to reinforce the end wall against inward deflection, the rib tends to fulcrum about the regions of the pads 27. Since the pads 27 are closer together than the weld connections 33 with the tie plates, it will be apparent that each rib is highly effective in reinforcing the associated end wall against inward deflection due to forces applied to the hubs. It will also be noted that the weld connections 35 are limited in length, and that no weld connections are provided between the pads 27 and the end walls. Thus during flexing movements of the rib and the adjacent wall portion, no shear stresses are set up in the weld connections.

As previously mentioned, the valve described above is provided with a gate having a port adapted to register with the flow passages for full open position. Such a valve requires a body with a lower extension to accommodate the gate for full closed position. Valves provided with a short gate require only a short boy extension below the hubs. In such event, and assuming that the lower extremity of the body is provided with a closure plate 15 with a substantial flange, sufficient strength may be provided to make unnecessary the use of ribbing such as shown in FIG. 3. Such ribbing may, however, be applied to the upper extension of the body immediately above the hubs 18.

Whether or not the ribs 36 are employed, and the number of such ribs, is dependent upon the pressures for which the valve is designed. For the higher operating pressures, such ribs can be employed in the manner illustrated to further reinforce the end walls against internal pressure.

I claim:

1. A gate valve comprising a body formed of flat end walls secured to spaced parallel sidewalls, the end walls having aligned openings forming flow passages, a gate within the body and movable between open and closed positions relative to the flow passages, hubs or pipe sections secured to the end walls in regions immediately surrounding the flow passages, a pair of ribs disposed in a common plane perpendicular to the end walls and extending across the body, said ribs being disposed adjacent to said openings, tie members secured to the extremities of said ribs and extending across the sides of the body, said members serving to tie the extremities of the ribs together at each side of the body, each rib having pads formed on their inner edges and disposed adjacent each side margin of the end wall and in abutting engagement with the same, each rib also having a medial portion between said pads and spaced therefrom, said medial portion being fixed to the adjacent medial portion of the end wall by welding, said pads also being spaced in their entirety from said tie members toward said medial portions, said ribs serving to reinforce the end walls against deflection under forces applied to the hubs or pipe sections tending to deflect the end walls inwardly of the body and also to reinforce the end walls against outward deflection.

2. A gate valve as in claim 1 in which said tie members extending along the sides of the body are tie plates secured to the extremities of said ribs by welding, said welding being in regions spaced from said pads and and from the corresponding corners of the body.

3. A gate valve as in claim 2 together with an additional pair of reinforcing ribs disposed in a plane parallel to the plane of the first named pair of ribs but spaced therefrom, the extremities of said second pair of ribs being secured to said tie plate by welding spaced from the corners of the body, said additional ribs having only their medial portions in engagement with the adjacent portions of the end walls to reinforce the same against outward deflection.

* * * * *